(12) United States Patent
Sehn (10) Patent No.: US 10,348,960 B1
(45) Date of Patent: *Jul. 9, 2019

(54) APPARATUS AND METHOD FOR SUPPLYING CONTENT AWARE PHOTO FILTERS

(71) Applicant: Snap Inc., Santa Monica, CA (US)

(72) Inventor: Timothy Sehn, Marina Del Ray, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/829,544

(22) Filed: Dec. 1, 2017

Related U.S. Application Data (63) Continuation of application No. 15/224,262, filed on Jul. 29, 2016, now Pat. No. 10,154,192, which is a continuation of application No. 14/977,380, filed on Dec. 21, 2015, now Pat. No. 9,407,816, which is a continuation of application No. 14/325,270, filed on Jul. 7, 2014, now Pat. No. 9,225,897.

(51) Int. Cl.
| | |
|---|---|
| *G06T 5/10* | (2006.01) |
| *H04N 1/00* | (2006.01) |
| *G06T 11/60* | (2006.01) |
| *H04N 5/232* | (2006.01) |

(52) U.S. Cl.
CPC .......... *H04N 5/23222* (2013.01); *G06T 5/10* (2013.01); *G06T 11/60* (2013.01); *H04N 1/00244* (2013.01); *H04N 5/23216* (2013.01); *H04N 5/23229* (2013.01); *H04N 5/23293* (2013.01); *H04N 2201/3253* (2013.01)

(58) Field of Classification Search
CPC ....... H04N 2101/00; H04N 2101/3253; H04N 2101/0084; H04N 2101/3226; H04N 2101/3252; H04N 2101/3277; H04N 2101/3242; H04N 5/23222; H04N 5/232; H04N 5/23219; H04N 5/23229; H04N 5/23206; H04N 5/23293; H04N 5/23216; H04N 5/2621; H04N 21/4524; H04N 21/25841; G06F 17/30265; G06F 17/30247; G06T 11/60; G06T 5/10

See application file for complete search history.

(56) References Cited

U.S. PATENT DOCUMENTS

| | | |
|---|---|---|
| 5,999,932 A | 12/1999 | Paul |
| 6,154,764 A | 11/2000 | Nitta et al. |
| 6,167,435 A | 12/2000 | Druckenmiller et al. |
| 6,204,840 B1 | 3/2001 | Petelycky et al. |
| 6,216,141 B1 | 4/2001 | Straub et al. |
| 6,310,694 B1 | 10/2001 | Okimoto et al. |
| 6,484,196 B1 | 11/2002 | Maurille |

(Continued)

OTHER PUBLICATIONS

TechPP "Daily App: InstaPlace (iOS/Android): Give Pictures a Sense of Place," Retrieved from the Internet on May 18, 2017, 9 pages, <http://techpp.com/2013/02/15/instaplace-app-review/>.*

*Primary Examiner* — Michael S Osinski
(74) *Attorney, Agent, or Firm* — Culhane Meadows PLLC; Stephen J. Weed (57) ABSTRACT

A server includes a photo filter module with instructions executed by a processor to identify when a client device captures a photograph. Photograph filters are selected based upon attributes of the client device and attributes of the photograph. The photograph filters are supplied to the client device.

17 Claims, 7 Drawing Sheets

(56) References Cited

U.S. PATENT DOCUMENTS

| | | | |
|---|---|---|---|
| 6,665,531 B1 | 12/2003 | Söderbacka et al. | |
| 6,724,403 B1 | 4/2004 | Santoro et al. | |
| 6,757,713 B1 | 6/2004 | Ogilvie et al. | |
| 6,898,626 B2 | 5/2005 | Ohashi | |
| 7,124,164 B1 | 10/2006 | Chemtob | |
| 7,149,893 B1 | 12/2006 | Leonard et al. | |
| 7,203,380 B2 | 4/2007 | Chiu et al. | |
| 7,243,163 B1 | 7/2007 | Friend et al. | |
| 7,356,564 B2 | 4/2008 | Hartselle et al. | |
| 7,519,670 B2 | 4/2009 | Hagale et al. | |
| 8,001,204 B2 | 8/2011 | Burtner et al. | |
| 8,098,904 B2 | 1/2012 | Ioffe et al. | |
| 8,112,716 B2 | 2/2012 | Kobayashi | |
| 8,276,092 B1 | 9/2012 | Narayanan et al. | |
| 8,279,319 B2* | 10/2012 | Date | G06F 17/30265 348/207.1 |
| 8,312,086 B2 | 11/2012 | Velusamy et al. | |
| 8,312,097 B1 | 11/2012 | Siegel et al. | |
| 8,379,130 B2* | 2/2013 | Forutanpour | G11B 27/034 348/333.01 |
| 8,405,773 B2 | 3/2013 | Hayashi et al. | |
| 8,418,067 B2 | 4/2013 | Cheng et al. | |
| 8,471,914 B2* | 6/2013 | Sakiyama | G06F 3/1204 348/207.1 |
| 8,560,612 B2 | 10/2013 | Kilmer et al. | |
| 8,687,021 B2 | 4/2014 | Bathiche et al. | |
| 8,744,523 B2 | 6/2014 | Fan et al. | |
| 8,775,972 B2 | 7/2014 | Spiegel | |
| 8,788,680 B1 | 7/2014 | Naik | |
| 8,797,415 B2* | 8/2014 | Arnold | H04N 5/23203 348/211.99 |
| 8,856,349 B2 | 10/2014 | Jain et al. | |
| 9,143,681 B1* | 9/2015 | Ebsen | H04W 4/029 |
| 2002/0047868 A1 | 4/2002 | Miyazawa | |
| 2002/0122659 A1* | 9/2002 | McGrath | G06F 17/30784 386/224 |
| 2002/0144154 A1 | 10/2002 | Tomkow | |
| 2002/0163531 A1* | 11/2002 | Ihara | G06F 1/162 715/719 |
| 2003/0016247 A1 | 1/2003 | Lai et al. | |
| 2003/0052925 A1 | 3/2003 | Daimon et al. | |
| 2003/0126215 A1 | 7/2003 | Udell et al. | |
| 2003/0164856 A1 | 9/2003 | Prager et al. | |
| 2004/0027371 A1 | 2/2004 | Jaeger | |
| 2004/0111467 A1 | 6/2004 | Willis | |
| 2004/0203959 A1 | 10/2004 | Coombes | |
| 2004/0239686 A1* | 12/2004 | Koyama | G06Q 10/107 345/620 |
| 2004/0243531 A1 | 12/2004 | Dean | |
| 2005/0078804 A1 | 4/2005 | Yomoda | |
| 2005/0097176 A1 | 5/2005 | Schatz et al. | |
| 2005/0104976 A1* | 5/2005 | Currans | G06F 17/30265 348/231.5 |
| 2005/0114783 A1 | 5/2005 | Szeto | |
| 2005/0122405 A1* | 6/2005 | Voss | H04N 5/232 348/211.2 |
| 2005/0193340 A1 | 9/2005 | Amburgey et al. | |
| 2005/0193345 A1 | 9/2005 | Klassen et al. | |
| 2005/0198128 A1 | 9/2005 | Anderson et al. | |
| 2005/0223066 A1 | 10/2005 | Buchheit et al. | |
| 2006/0114338 A1* | 6/2006 | Rothschild | G06F 17/30265 348/231.99 |
| 2006/0270419 A1 | 11/2006 | Crowley et al. | |
| 2007/0040931 A1 | 2/2007 | Nishizawa | |
| 2007/0073823 A1 | 3/2007 | Cohen et al. | |
| 2007/0082707 A1 | 4/2007 | Flynt et al. | |
| 2007/0192128 A1 | 8/2007 | Celestini | |
| 2007/0214216 A1 | 9/2007 | Carrer et al. | |
| 2007/0233801 A1 | 10/2007 | Eren et al. | |
| 2007/0243887 A1 | 10/2007 | Bandhole et al. | |
| 2007/0255456 A1* | 11/2007 | Funayama | H04N 1/32128 700/266 |
| 2008/0025701 A1 | 1/2008 | Ikeda | |
| 2008/0033930 A1 | 2/2008 | Warren | |
| 2008/0055269 A1 | 3/2008 | Lemay et al. | |
| 2008/0104503 A1 | 5/2008 | Beall et al. | |
| 2008/0147730 A1* | 6/2008 | Lee | G06Q 30/0212 |
| 2008/0207176 A1 | 8/2008 | Brackbill et al. | |
| 2008/0222545 A1 | 9/2008 | Lemay et al. | |
| 2008/0256446 A1 | 10/2008 | Yamamoto | |
| 2008/0266421 A1* | 10/2008 | Takahata | H04N 5/772 348/231.5 |
| 2008/0270938 A1 | 10/2008 | Carlson | |
| 2008/0313346 A1 | 12/2008 | Kujawa et al. | |
| 2009/0006565 A1 | 1/2009 | Velusamy et al. | |
| 2009/0015703 A1 | 1/2009 | Kim et al. | |
| 2009/0024956 A1 | 1/2009 | Kobayashi | |
| 2009/0040324 A1* | 2/2009 | Nonaka | H04N 5/232 348/220.1 |
| 2009/0042588 A1 | 2/2009 | Lottin et al. | |
| 2009/0058822 A1 | 3/2009 | Chaudhri | |
| 2009/0079846 A1* | 3/2009 | Chou | H04N 9/735 348/223.1 |
| 2009/0132453 A1 | 5/2009 | Hangartner et al. | |
| 2009/0132665 A1 | 5/2009 | Thomsen et al. | |
| 2009/0160970 A1* | 6/2009 | Fredlund | H04N 5/232 348/229.1 |
| 2009/0265647 A1 | 10/2009 | Martin et al. | |
| 2010/0082693 A1 | 4/2010 | Hugg et al. | |
| 2010/0131880 A1 | 5/2010 | Lee et al. | |
| 2010/0131895 A1 | 5/2010 | Wohlert | |
| 2010/0156933 A1 | 6/2010 | Jones et al. | |
| 2010/0159944 A1 | 6/2010 | Pascal et al. | |
| 2010/0161831 A1 | 6/2010 | Haas et al. | |
| 2010/0185665 A1 | 7/2010 | Horn et al. | |
| 2010/0214436 A1* | 8/2010 | Kim | H04N 9/735 348/223.1 |
| 2010/0223128 A1 | 9/2010 | Dukellis et al. | |
| 2010/0223343 A1 | 9/2010 | Bosan et al. | |
| 2010/0257196 A1 | 10/2010 | Waters et al. | |
| 2010/0281045 A1 | 11/2010 | Dean | |
| 2010/0306669 A1 | 12/2010 | Pasqua | |
| 2011/0004071 A1 | 1/2011 | Faiola et al. | |
| 2011/0040783 A1 | 2/2011 | Uemichi et al. | |
| 2011/0040804 A1 | 2/2011 | Peirce et al. | |
| 2011/0050909 A1* | 3/2011 | Ellenby | G03B 17/24 348/207.1 |
| 2011/0050915 A1* | 3/2011 | Wang | H04N 5/232 348/207.99 |
| 2011/0102630 A1* | 5/2011 | Rukes | H04N 9/735 348/223.1 |
| 2011/0145564 A1 | 6/2011 | Moshir et al. | |
| 2011/0197194 A1 | 8/2011 | D'Angelo et al. | |
| 2011/0202968 A1 | 8/2011 | Nurmi | |
| 2011/0211534 A1 | 9/2011 | Schmidt et al. | |
| 2011/0213845 A1 | 9/2011 | Logan et al. | |
| 2011/0273575 A1* | 11/2011 | Lee | G01C 21/20 348/222.1 |
| 2011/0283188 A1 | 11/2011 | Farrenkopf et al. | |
| 2011/0320373 A1 | 12/2011 | Lee et al. | |
| 2012/0028659 A1 | 2/2012 | Whitney et al. | |
| 2012/0062805 A1 | 3/2012 | Candelore | |
| 2012/0081573 A1* | 4/2012 | Park | H04N 1/00167 348/231.3 |
| 2012/0108293 A1 | 5/2012 | Law et al. | |
| 2012/0110096 A1 | 5/2012 | Smarr et al. | |
| 2012/0113143 A1 | 5/2012 | Adhikari et al. | |
| 2012/0113272 A1* | 5/2012 | Hata | H04N 1/00251 348/207.1 |
| 2012/0131507 A1 | 5/2012 | Sparandara et al. | |
| 2012/0131512 A1 | 5/2012 | Takeuchi et al. | |
| 2012/0143760 A1 | 6/2012 | Abulafia et al. | |
| 2012/0150978 A1 | 6/2012 | Monaco et al. | |
| 2012/0166971 A1 | 6/2012 | Sachson et al. | |
| 2012/0169855 A1* | 7/2012 | Oh | H04N 7/185 348/61 |
| 2012/0173991 A1 | 7/2012 | Roberts et al. | |
| 2012/0176401 A1* | 7/2012 | Hayward | G06T 3/0093 345/619 |
| 2012/0184248 A1 | 7/2012 | Speede | |
| 2012/0200743 A1* | 8/2012 | Blanchflower | H04N 21/254 348/239 |

(56) References Cited

U.S. PATENT DOCUMENTS

| | | |
|---|---|---|
| 2012/0210244 A1 | 8/2012 | Lopez et al. |
| 2012/0212632 A1* | 8/2012 | Mate ................... G06F 17/3028 348/207.11 |
| 2012/0220264 A1 | 8/2012 | Kawabata |
| 2012/0233000 A1 | 9/2012 | Fisher et al. |
| 2012/0236162 A1* | 9/2012 | Imamura ............ H04N 5/23258 348/207.99 |
| 2012/0239761 A1 | 9/2012 | Linner et al. |
| 2012/0250951 A1 | 10/2012 | Chen |
| 2012/0268615 A1* | 10/2012 | Choi .................... H04N 5/2621 348/211.99 |
| 2012/0278387 A1 | 11/2012 | Garcia et al. |
| 2012/0278692 A1 | 11/2012 | Shi |
| 2012/0299954 A1 | 11/2012 | Wada et al. |
| 2012/0304080 A1 | 11/2012 | Wormald et al. |
| 2012/0307096 A1* | 12/2012 | Ford .................... H04N 5/23219 348/222.1 |
| 2012/0307112 A1* | 12/2012 | Kunishige .......... H04N 5/23229 348/239 |
| 2012/0323933 A1 | 12/2012 | He et al. |
| 2013/0050260 A1 | 2/2013 | Reitan |
| 2013/0057587 A1 | 3/2013 | Leonard et al. |
| 2013/0059607 A1 | 3/2013 | Herz et al. |
| 2013/0060690 A1 | 3/2013 | Oskolkov et al. |
| 2013/0063369 A1 | 3/2013 | Malharta et al. |
| 2013/0067027 A1 | 3/2013 | Song et al. |
| 2013/0071093 A1 | 3/2013 | Hanks et al. |
| 2013/0085790 A1 | 4/2013 | Palmer et al. |
| 2013/0128059 A1* | 5/2013 | Kristensson ......... H04M 1/72522 348/207.1 |
| 2013/0145286 A1 | 6/2013 | Feng et al. |
| 2013/0169822 A1* | 7/2013 | Zhu ...................... G06T 7/0018 348/180 |
| 2013/0173729 A1 | 7/2013 | Starensky et al. |
| 2013/0182133 A1* | 7/2013 | Tanabe ............... H04N 5/23203 348/207.11 |
| 2013/0185131 A1 | 7/2013 | Sinha et al. |
| 2013/0194301 A1 | 8/2013 | Robbins et al. |
| 2013/0198176 A1 | 8/2013 | Kim |
| 2013/0222323 A1 | 8/2013 | McKenzie |
| 2013/0227476 A1 | 8/2013 | Frey |
| 2013/0232194 A1 | 9/2013 | Knapp et al. |
| 2013/0263031 A1 | 10/2013 | Oshiro et al. |
| 2013/0265450 A1* | 10/2013 | Barnes, Jr. ............... H04N 5/77 348/207.1 |
| 2013/0290443 A1 | 10/2013 | Collins et al. |
| 2013/0329060 A1* | 12/2013 | Yim ................... G06F 17/30244 348/207.1 |
| 2013/0344896 A1 | 12/2013 | Kirmse et al. |
| 2013/0346877 A1 | 12/2013 | Borovoy et al. |
| 2014/0002578 A1* | 1/2014 | Rosenberg ........ H04M 1/72555 348/14.03 |
| 2014/0011538 A1 | 1/2014 | Mulcahy et al. |
| 2014/0032682 A1 | 1/2014 | Prado et al. |
| 2014/0047045 A1 | 2/2014 | Baldwin et al. |
| 2014/0047335 A1 | 2/2014 | Lewis et al. |
| 2014/0049652 A1* | 2/2014 | Moon .................. H04N 9/8233 348/207.1 |
| 2014/0052485 A1 | 2/2014 | Shidfar |
| 2014/0052633 A1 | 2/2014 | Gandhi |
| 2014/0057660 A1 | 2/2014 | Wager |
| 2014/0122658 A1 | 5/2014 | Haeger et al. |
| 2014/0122787 A1 | 5/2014 | Shalvi et al. |
| 2014/0129953 A1 | 5/2014 | Spiegel |
| 2014/0143143 A1 | 5/2014 | Fasoli et al. |
| 2014/0149519 A1 | 5/2014 | Redfern et al. |
| 2014/0155102 A1 | 6/2014 | Cooper et al. |
| 2014/0173457 A1 | 6/2014 | Wang et al. |
| 2014/0176732 A1* | 6/2014 | Cohen ................ H04N 5/23293 348/207.1 |
| 2014/0189592 A1 | 7/2014 | Benchenaa et al. |
| 2014/0207679 A1 | 7/2014 | Cho |
| 2014/0214471 A1 | 7/2014 | Schreiner |
| 2014/0279436 A1 | 9/2014 | Dorsey et al. |
| 2014/0280537 A1 | 9/2014 | Pridmore et al. |
| 2014/0282096 A1 | 9/2014 | Rubinstein et al. |
| 2014/0317302 A1 | 10/2014 | Naik |
| 2014/0325383 A1 | 10/2014 | Brown et al. |
| 2015/0046278 A1 | 2/2015 | Pei et al. |
| 2015/0116529 A1* | 4/2015 | Wu ..................... H04N 5/23222 348/222.1 |
| 2015/0172534 A1* | 6/2015 | Miyakawa ......... H04N 5/23216 348/222.1 |
| 2015/0222814 A1* | 8/2015 | Li ....................... G06F 3/04845 348/239 |

* cited by examiner

APPARATUS AND METHOD FOR SUPPLYING CONTENT AWARE PHOTO FILTERS

CROSS REFERENCE TO RELATED APPLICATIONS

This application is a continuation of U.S. application Ser. No. 15/224,262, filed Jul. 29, 2016, which claims priority to U.S. application Ser. No. 14/977,380, filed Dec. 21, 2015, which claims benefit to U.S. application Ser. No. 14/325,270, filed Jul. 7, 2014, now issued as U.S. Pat. No. 9,225,897, all of which are incorporated herein by reference in their entirety.

FIELD OF THE INVENTION

This invention relates generally to photographs taken by a mobile device operative in a networked environment. More particularly, this invention relates to supplying such a mobile device with content aware photo filters.

BACKGROUND OF THE INVENTION

The number of digital photographs taken with mobile wireless devices is increasingly outnumbering photographs taken with dedicated digital and film based cameras. Thus, there are growing needs to improve the experience associated with mobile wireless digital photography.

SUMMARY OF THE INVENTION

A server includes a photo filter module with instructions executed by a processor to identify when a client device captures a photograph. Photograph filters are selected based upon attributes of the client device and attributes of the photograph. The photograph filters are supplied to the client device.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
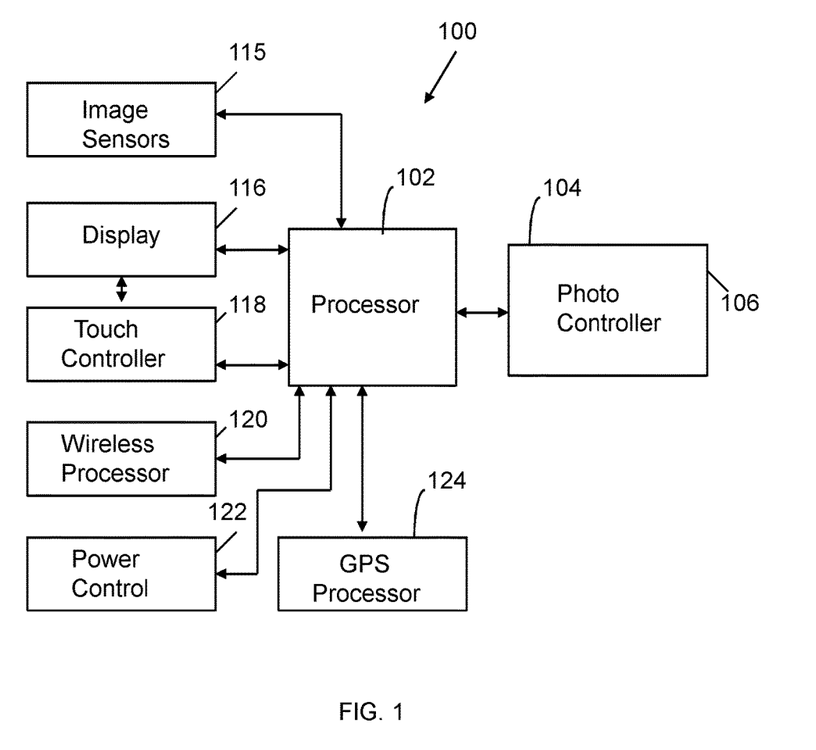
FIG. 1 illustrates an electronic device utilized in accordance with an embodiment of the invention.

FIG. 1 illustrates an electronic device 100 utilized in accordance with an embodiment of the invention. In one embodiment, the electronic device 100 is a Smartphone with a processor 102 in communication with a memory 104. The processor 102 may be a central processing unit and/or a graphics processing unit. The memory 104 is a combination of flash memory and random access memory. The memory 104 stores a photo controller 106. The photo controller 106 includes executable instructions to coordinate the capture, display and archiving of digital photographs. The photo controller 106 may include photo filter processing disclosed herein, which augments or replaces such photo filter processing that is described below in connection with a server based photo filter module.

The processor 102 is also coupled to image sensors 115. The image sensors 115 may be known digital image sensors, such as charge coupled devices. The image sensors capture visual media, which is presented on display 116, as coordinated by the photo controller 106.

A touch controller 118 is connected to the display 116 and the processor 102. The touch controller 118 is responsive to haptic signals applied to the display 116. In one embodiment, the photo controller 106 monitors signals from the touch controller 118 to coordinate the capture, display and archiving of digital photographs. The electronic device 100 may also include other components commonly associated with a Smartphone, such as a wireless signal processor 120 to support wireless communications, a power control circuit 122 and a global positioning system processor 124.

Figure 2:
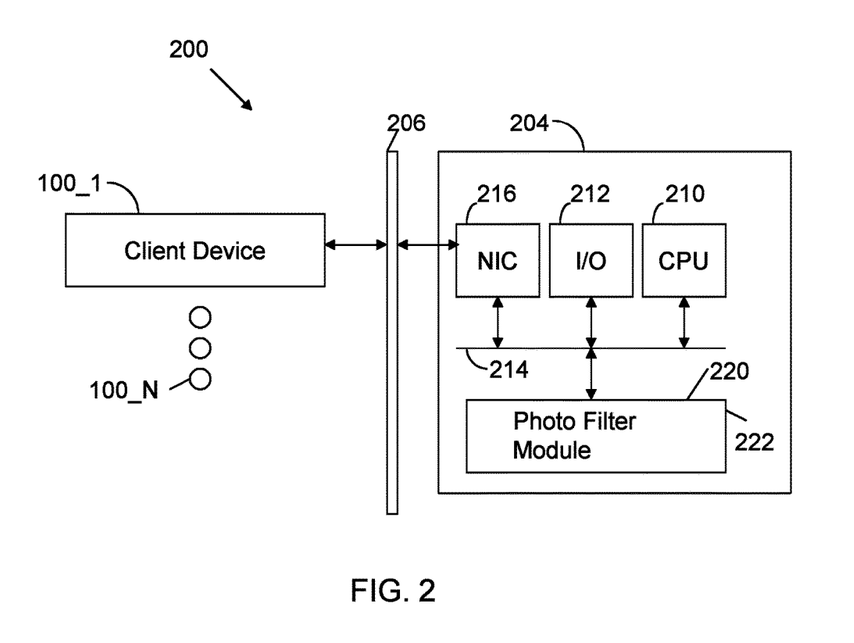
FIG. 2 illustrates a networked system utilized in accordance with an embodiment of the invention.

FIG. 2 illustrates a system 200 configured in accordance with an embodiment of the invention. The system 20X) includes a set of client devices 100_1 through 100_N. The client devices 100 are connected to a network 206, which is any combination of wireless and wired network communication devices. A server 204 is also connected to the network 206. The server 204 includes standard components, such as a central processing unit 210 and input/output devices 212 connected via a bus 214. The input/output devices 212 may include a keyboard, mouse, display and the like. A network interface circuit 216 is also connected to the bus 214 to provide connectivity to network 206. A memory 220 is also connected to the bus 214. The memory 220 includes modules with executable instructions, such as a photo filter module 222. The photo filter module 222 implements photo evaluation and filter selection operations, as discussed below.

Figure 3:
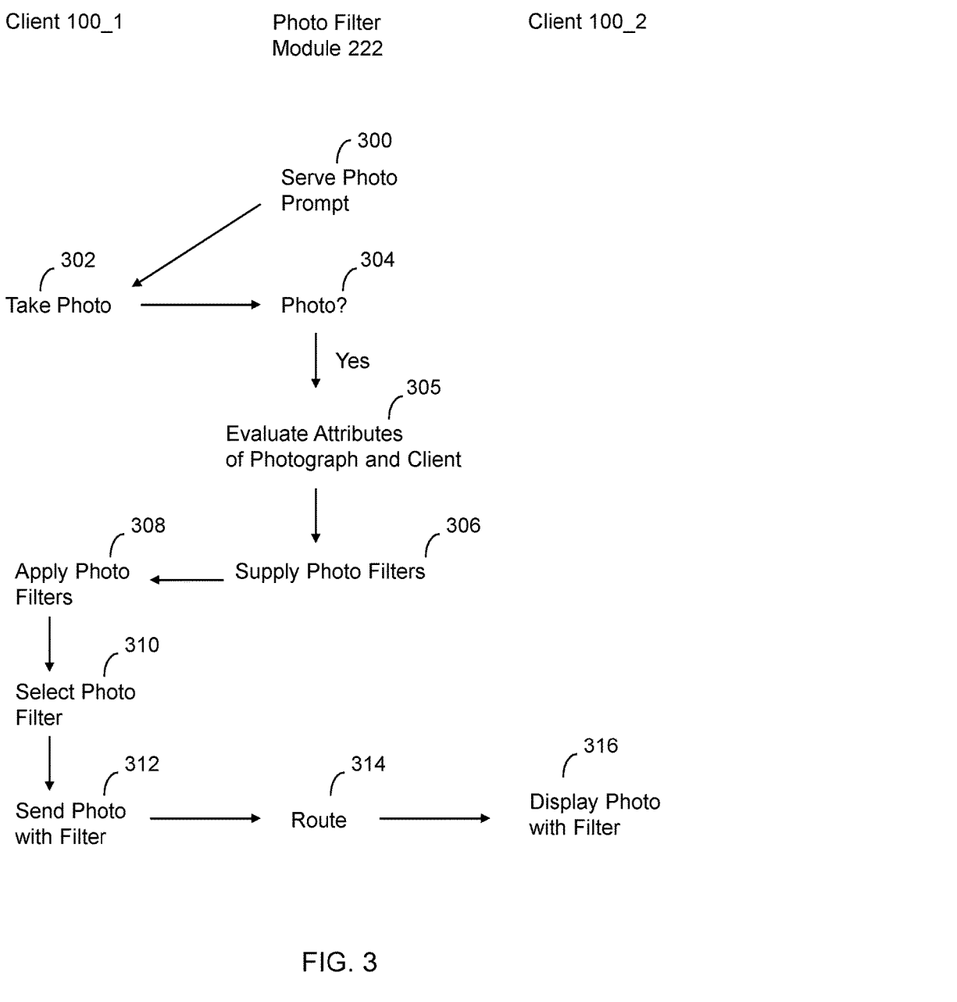
FIG. 3 illustrates processing operations associated with an embodiment of the invention.

FIG. 3 illustrates processing operations associated with an embodiment of the invention. The operations are performed by the photo filter module 222 of server 204 in combination with one or more client devices 100. Initially, the photo filter module 222 serves a photo prompt 300. For example, the photo filter module 222 may form a segment of a network executed application that coordinates taking photographs and appending messages to such photographs for delivery from one user to another. In this context, client 100_1 accesses the photo filter module 222 over network 206 to activate the application, which serves the photo prompt to the client 100_1. A user at the client 100_1 takes a photo 302.

Figure 4:
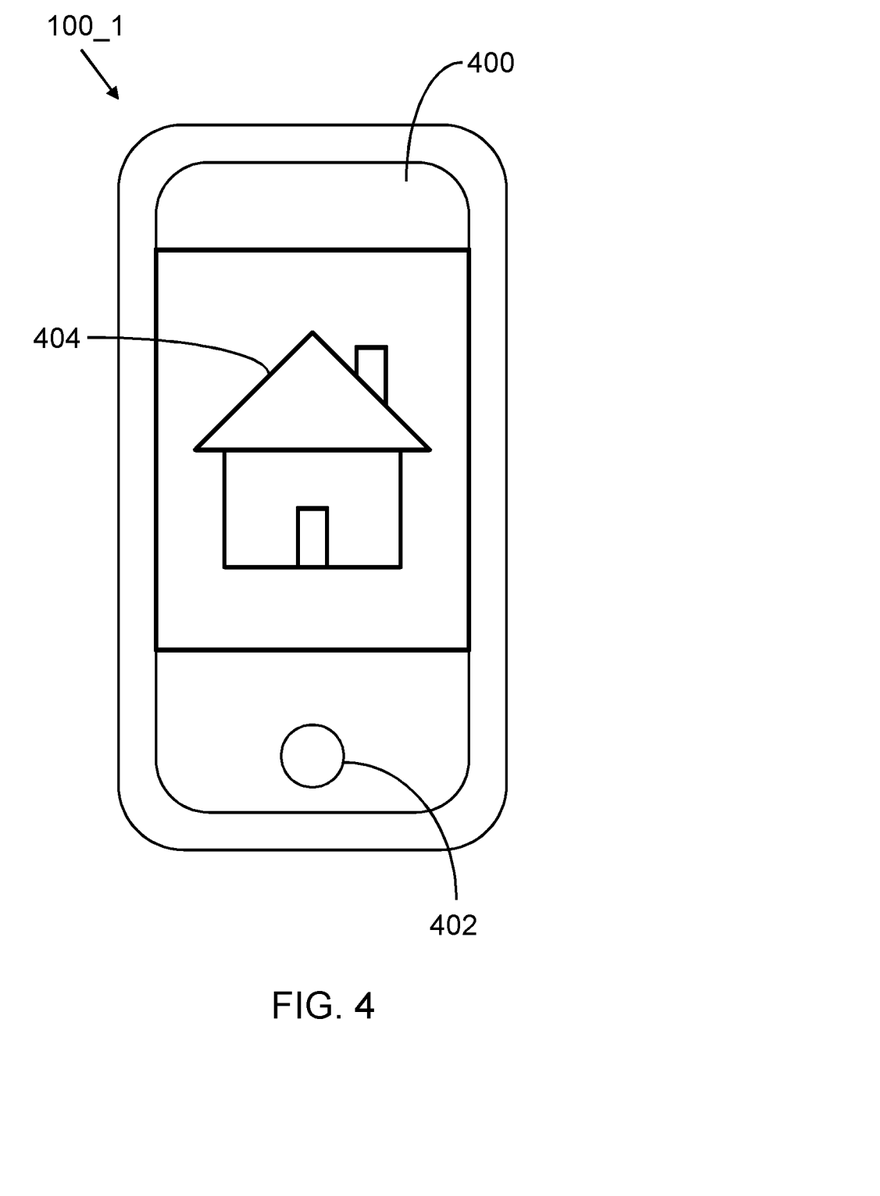
FIG. 4 illustrates a photograph taken by a digital mobile device.

FIG. 4 illustrates client device 100_1 with a display 400 that presents a photo prompt 402. Activation of the photo prompt 402 results in a picture 404. The photo filter module 222 monitors the client device activity to determine if a photo is taken 304. If so, the attributes of the photograph and client device are evaluated 305. Photo filters are selected and supplied 306 based upon the evaluation.

By way of example, the attributes of the client device may include geolocation of the client device, which is collected from the GPS processor 124. The geolocation may be used to designate photo filters relevant to the geolocation. For example, if the geolocation is proximate to a beach, then photo filters to augment a beach setting (e.g., a color filter for water, sand and/or sky) may be supplied. The geolocation may be used to select a filter with a brand associated with an establishment proximate to the geolocation. For example, a restaurant or store may sponsor a photo filter that includes a brand associated with the restaurant or store. In this case, in addition to the brand, the photo filter may include other indicia associated with the restaurant (e.g., an image of a hamburger or taco) or store (e.g., an image of a surf board or sun glasses).

The attributes associated with the client device may include established preferences associated with the client device. The established preferences may be defined by explicitly stated preferences supplied by a user. Alternately, the established preferences may be derived from prior use patterns. For example, explicitly stated or derived preferences may indicate that photo filters with a temperature overlay, date and/or time overlay be supplied.

The attributes of the photograph may include the physical environment captured in the photograph. For example, the photograph may be evaluated to identify an urban setting, a rural setting, a sunset a seascape and the like. Filters applicable to the physical environment may then be supplied.

The attributes of the photograph may include an object depicted in the photograph. For example, the evaluation may identify a building, a building feature (e.g., door or roof), a flower, an individual, an animal and the like. Filters applicable to such objects may then be supplied.

Figure 5:
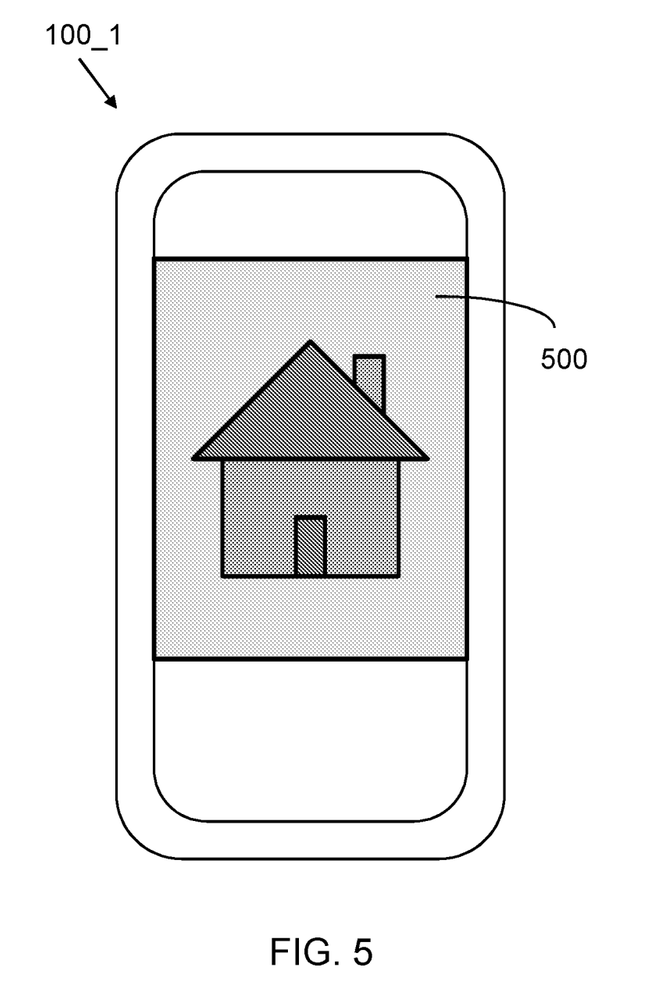
FIG. 5 illustrates a general filter applied to the photograph.
Figure 6:
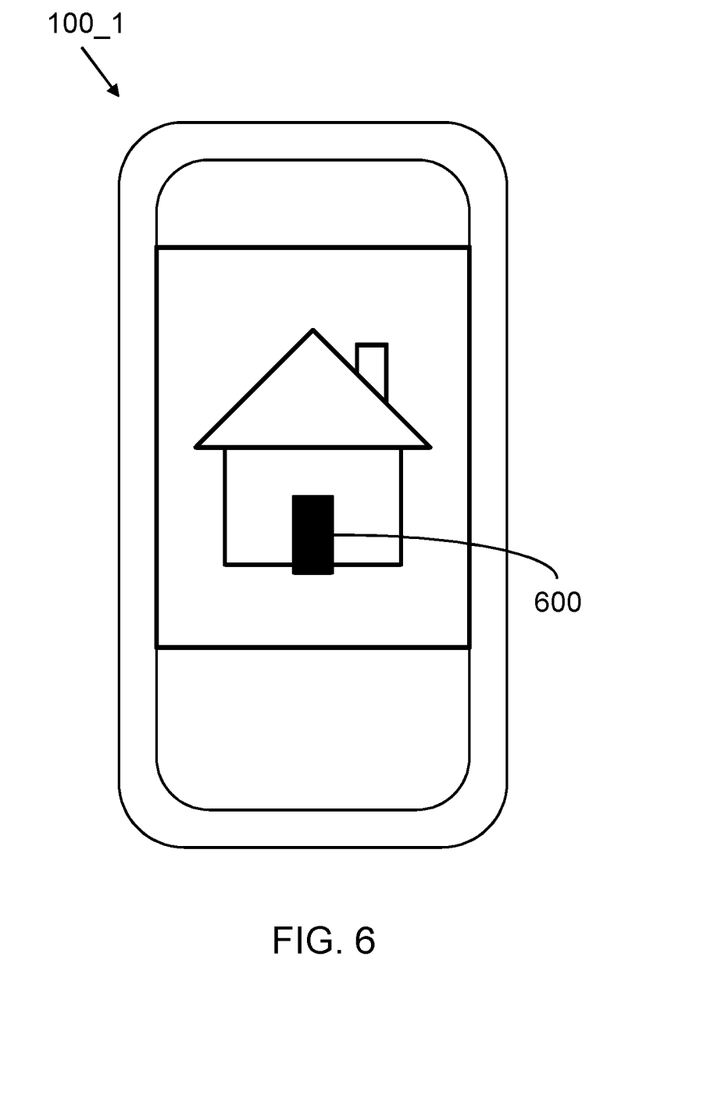
FIG. 6 illustrates a feature specific filter applied to the photograph.
Figure 7:
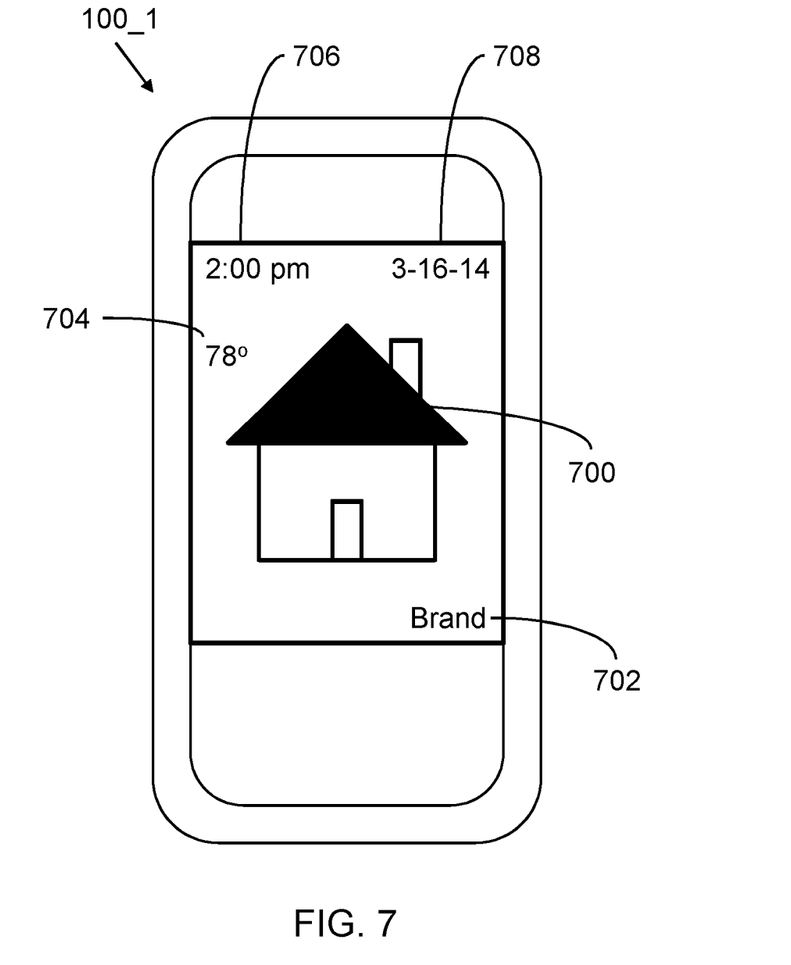
FIG. 7 illustrates a different feature specific filter with a branded element applied to the photograph.

The next operation of FIG. 3 is to apply the photo filters 308. For example, a swipe across the display of a client device 100_1 may cause a photo filter to slide across the original photo. FIG. 5 illustrates the result of a first swipe motion, which results in a darkening filter 500 being applied to the original photo. Another swipe motion may result in another filter being presented. For example, FIG. 6 illustrates the result of a second swipe motion, which results in an object specific filter 600 being presented. In this case, the object specific filter 600 relates to the identification of a door in the photo. The identification of the door may result in the supply of a variety of filters for different door colors. Another swipe of the display may result in still another filter, such as shown in FIG. 7. The filter of FIG. 7 includes an object specific filter 700, in this case for a roof of a building. The filter also includes a brand component 702. This filter also includes an overlay of the temperature 704 when the photo was taken. A time overlay 706 and date overlay 708 are also supplied.

Returning to FIG. 3, the next operation is to select a photo filter 310. Selection of a photo filter may include selection of one or more available filters. The photo may then be saved with the applicable filter or filters. The photo and filter may also be sent to another user 312. In this case, the server 204 routes 314 the photo to another client 100_2, which displays the photo with the filter 316.

Photograph filters may also be selected based upon popular filters. Branded filters may be supplied based upon an auction mechanism. For example, vendors may bid on photo filters to be supplied based upon characteristics of a user, location of a user, content of a photograph and the like.

An embodiment of the present invention relates to a computer storage product with a non-transitory computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media, optical media, magneto-optical media and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

What is claimed is:

1. A server, comprising:
a photograph filter module with instructions executed by a processor to:
identify when a client device captures a photograph;
select a plurality of photograph filters based at least in part on geolocation information received from the client device, the plurality of photograph filters incorporating the geolocation information received from the client device;
supply the plurality of photograph filters to the client device, wherein the plurality of photograph filters are configured to be individually selectable for sequential presentation on a display of the client device and the plurality of photograph filters are not presented on the display of the client device until a gesture is applied to the display of the client device by a user, and then are sequentially overlaid on top of the photograph captured by the client device to augment the photograph in response to the gesture of the user applied to the display of the client device.

2. The server of claim 1, wherein the photograph filter module is further configured to receive a selection of the at least one photograph filter from the client device and route the photograph augmented with the at least one photograph filter to another client device.

3. The server of claim 2, wherein the receiving of the selection of the at least one photograph filter comprises receiving an indication that the user has applied the gesture to the photograph while the photograph is presented on a display of the client device.

4. The server of claim 1, wherein the geolocation information comprises at least one of temperature indicia for the geolocation, date indicia for the geolocation, and time indicia for the geolocation.

5. The server of claim 1, wherein the at least one photograph filter further incorporates indicia associated with the geolocation.

6. The server of claim 5, wherein the indicia comprises brand indicia of a third party associated with the geolocation.

7. The server of claim 1, wherein the selection is further based on explicitly stated preferences supplied by the user.

8. The server of claim 7, wherein the selection is further based on prior use patterns of the user.

9. A method comprising:
- identifying when a client device captures a photograph;
- selecting a plurality of photograph filters based at least in part on geolocation information received from the client device, the plurality of photograph filters incorporating the geolocation information received from the client device;
- supplying the plurality of photograph filters to the client device, wherein the plurality of photograph filters are configured to be individually selectable for sequential presentation on a display of the client device and are not presented on the display of the client device until a gesture is applied to the display of the client device by a user, and then are sequentially overlaid on top of the photograph to augment the photograph in response to the gesture of the user applied to the display of the client device.

10. The method of claim 9, wherein further comprising receiving a selection of the at least one photograph filter from the client device and route the photograph augmented with the at least one photograph filter to another client device.

11. The method of claim 10, wherein the receiving of the selection of the at least one photograph filter comprises receiving an indication that the user has applied the gesture to the photograph while the photograph is presented on a display of the client device.

12. The method of claim 9, wherein the geolocation information comprises at least one of temperature indicia for the geolocation, date indicia for the geolocation, and time indicia for the geolocation.

13. The method of claim 9, wherein the at least one photograph filter further incorporates indicia associated with the geolocation.

14. The method of claim 13, wherein the indicia comprises brand indicia of a third party associated with the geolocation.

15. The method of claim 9, wherein the selection is further based on explicitly stated preferences supplied by the user.

16. The method of claim 15, wherein the selection is further based on prior use patterns of the user.

17. A server, comprising:
- a photograph filter module with instructions executed by a processor to:
- identify when a client device captures a photograph;
- select a plurality of photograph filters based at least in part on geolocation information received from the client device;
- supply the plurality of photograph filters to the client device, wherein the plurality of photograph filters are configured to be individually selectable for sequential presentation on a display of the client device and are not presented on the display of the client device until a gesture is applied to the display of the client device by a user, and then are sequentially overlaid on top of the photograph to augment the photograph in response to the gesture of the user applied to the display of the client device.

\* \* \* \* \*